(12) United States Patent
Talstra et al.

(10) Patent No.: US 7,561,715 B2
(45) Date of Patent: Jul. 14, 2009

(54) METHOD AND ARRANGEMENT FOR WATERMARK DETECTION

(75) Inventors: Johan Cornelis Talstra, Eindhoven (NL); Job Cornelis Oostveen, Eindhoven (NL); Gerrit Cornelis Langelaar, Eindhoven (NL); Antonius Adrianus Cornelis Maria Kalker, Eindhoven (NL); Maurice Jerome Justin Jean-Baptiste Maes, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 564 days.

(21) Appl. No.: 10/525,483

(22) PCT Filed: Aug. 12, 2003

(86) PCT No.: PCT/IB03/03594

§ 371 (c)(1),
(2), (4) Date: Feb. 23, 2005

(87) PCT Pub. No.: WO2004/021277

PCT Pub. Date: Mar. 11, 2004

(65) Prior Publication Data

US 2006/0126887 A1    Jun. 15, 2006

(30) Foreign Application Priority Data

Aug. 28, 2002    (EP)    .................. 02078544

(51) Int. Cl.
*G06K 9/00* (2006.01)
*H04N 7/167* (2006.01)
(52) U.S. Cl. .................. 382/100; 382/166; 380/200
(58) Field of Classification Search .................. 382/100, 382/112, 162, 182, 169–172, 176, 237, 232–235, 382/242, 250, 251, 191, 260, 248, 294, 305; 348/475, 572, 166; 235/380, 468; 375/240.25, 375/240.12; 380/200
See application file for complete search history.

(56) References Cited

U.S. PATENT DOCUMENTS

| 3,665,162 | A | * | 5/1972 | Yamamota et al. | ........... 235/380 |
| 4,628,362 | A | * | 12/1986 | Waehner | ................... 348/572 |
| 6,411,725 | B1 | * | 6/2002 | Rhoads | .................. 382/100 |
| 6,829,301 | B1 | * | 12/2004 | Tinker et al. | ........... 375/240.12 |
| 7,050,603 | B2 | * | 5/2006 | Rhoads et al. | ............... 382/100 |
| 7,203,310 | B2 | * | 4/2007 | England et al. | ............. 380/200 |
| 7,239,747 | B2 | * | 7/2007 | Bresler et al. | ............... 382/176 |
| 2002/0057823 | A1 | | 5/2002 | Sharma et al. | |

* cited by examiner

*Primary Examiner*—Seyed Azarian
(74) *Attorney, Agent, or Firm*—Larry Liberchuk

(57) ABSTRACT

A graphics card of a computer system is configured to detect watermarks within a video signal that includes one or more windows of a display. The frames of the video signal are analyzed to locate image areas in which the video signal changes, and a bounding box around these areas of change is defined as an area(s) of interest. Watermark detection is then performed within the area(s) of interest.

16 Claims, 5 Drawing Sheets

METHOD AND ARRANGEMENT FOR WATERMARK DETECTION

FIELD OF THE INVENTION

The invention relates to a method and arrangement for detecting a watermark in a media signal, more particularly in a media signal being played back through a graphics card of a personal computer.

BACKGROUND OF THE INVENTION

Until very recently the DVD copy-protection community considered watermark-detection for playback-control in a personal computer to take place in the DVD-ROM or DVD-rewriter drive. The motivation for this position was that watermark-detection is a permissive technology (i.e. the playback or recording device works with or without watermark detector) as opposed to encryption, which requires a decryptor for the device to function properly. The fragile consensus used to be that DVD-ROM drives would inspect MPEG2-compressed unencrypted DVD-video content on disks for presence of a copy-never or copy-once watermark. If such were the case, playback should be stopped (because copy-once or copy-never content should be encrypted at all times).

FIG. 1 shows schematically such a PC system architecture with watermark-detection for playback-control in the DVD-drive. The PC comprises a DVD-drive 1, a motherboard 2 with microprocessor and associated circuitry for executing the operating system and application software, and a graphics card 3. The motherboard is provided with an IDE-bus 4 for transferring data to and from the DVD-drive, and an AGP-slot or PCI-slot 5 for connecting the graphics card. The DVD-drive includes a basic engine 11 for reading data from a DVD disk 6 and a host interface 12 for connecting the drive to the IDE bus. In order to enable watermark detection by a watermark detector core 14, the drive comprises an MPEG2-parser 13 to at least partially decompress the content. Stopping playback of content is symbolically denoted by means of a switch 15, which is controlled by the watermark detector core 14.

However, a PC system with playback-control using a watermark detector in the DVD drive leaves major security holes in an open-architecture PC. One such security hole is that content may be recorded in scrambled form by flipping all bits. Since this is no longer a compliant MPEG2 stream, the parser 13 in the drive will fail and no watermark will be seen. The bit-flip can be undone just before or inside the media-player software. Another such security hole is that content may be compressed not using MPEG2, but using other compression schemes such as MPEG4 (popularized under the name DivX), fractal coding, Windows Media, Real, etc. Since it is impossible for the DVD-drive to have parsers on board for all of these formats (and hackers will invent new codecs to outsmart the drive), the watermark will not be detected. Although (illegal) copies compressed with a codec other than MPEG2 will generally not play on current DVD-video players there is a trend for DVD-video players to support more and more codecs.

Therefore it has already been proposed to place the watermark detector after decompression and just before rendering, i.e. in an MPEG-decoder card or in a graphics card. After decompression there is no longer confusion because all content reduces to the unequivocal baseband-format ready for consumption by human eyes. Initially, it was considered difficult to enforce MPEG-decoder companies or graphics-card manufacturers to install such watermark detectors. This perception has changed since.

Although it is architecturally very simple and clean to detect watermarks in the graphics-card, in practice there are a number of problems with this location, due to the enormous amounts of data that flow through the graphics card at huge speed, and due to the fact that multiple streams can be displayed at the same time.

OBJECT AND SUMMARY OF THE INVENTION

It is an object of the invention to provide a solution for the above-identified problems. To this end, the invention provides methods and arrangements as defined in the independent claims. Advantageous embodiments are defined in the dependent claims.

DESCRIPTION OF EMBODIMENTS

Figure 1:
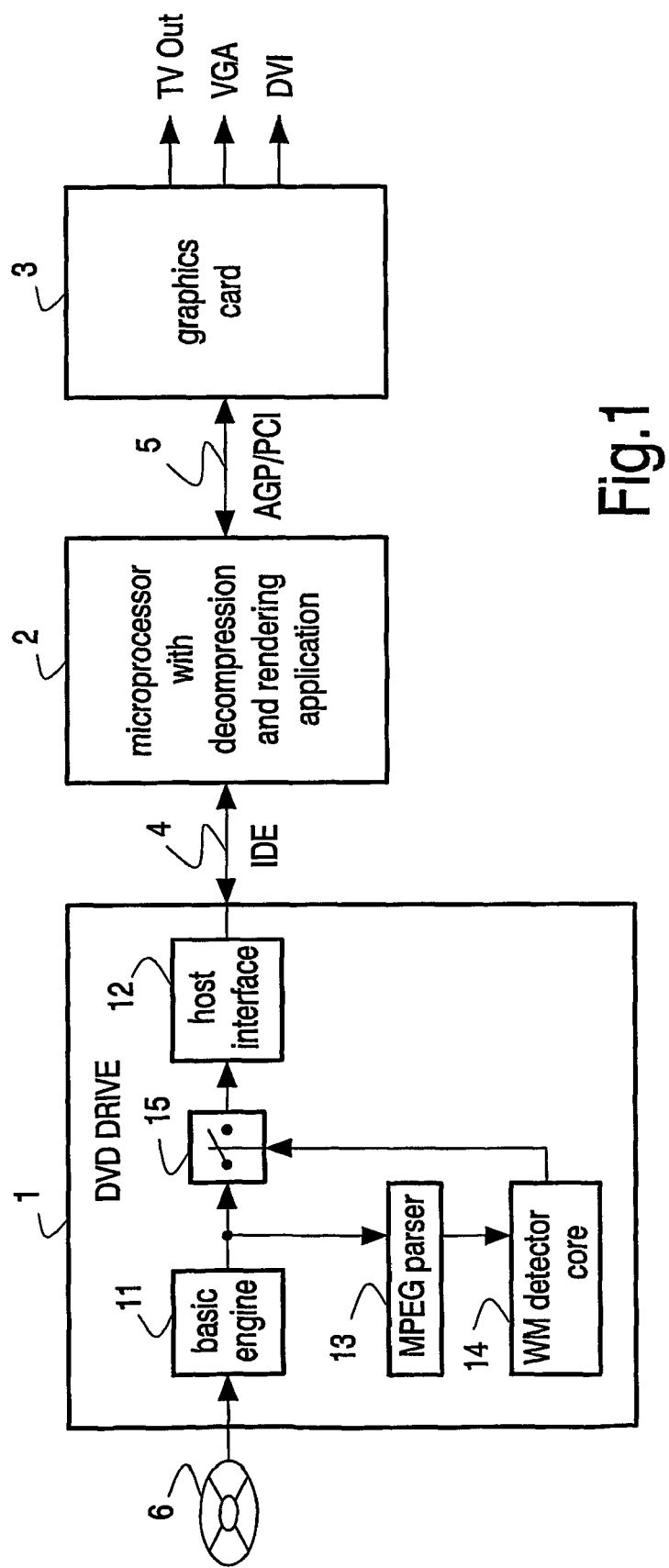
FIG. 1 shows schematically a prior art personal computer architecture with watermark-detection in the DVD-drive.
Figure 2:
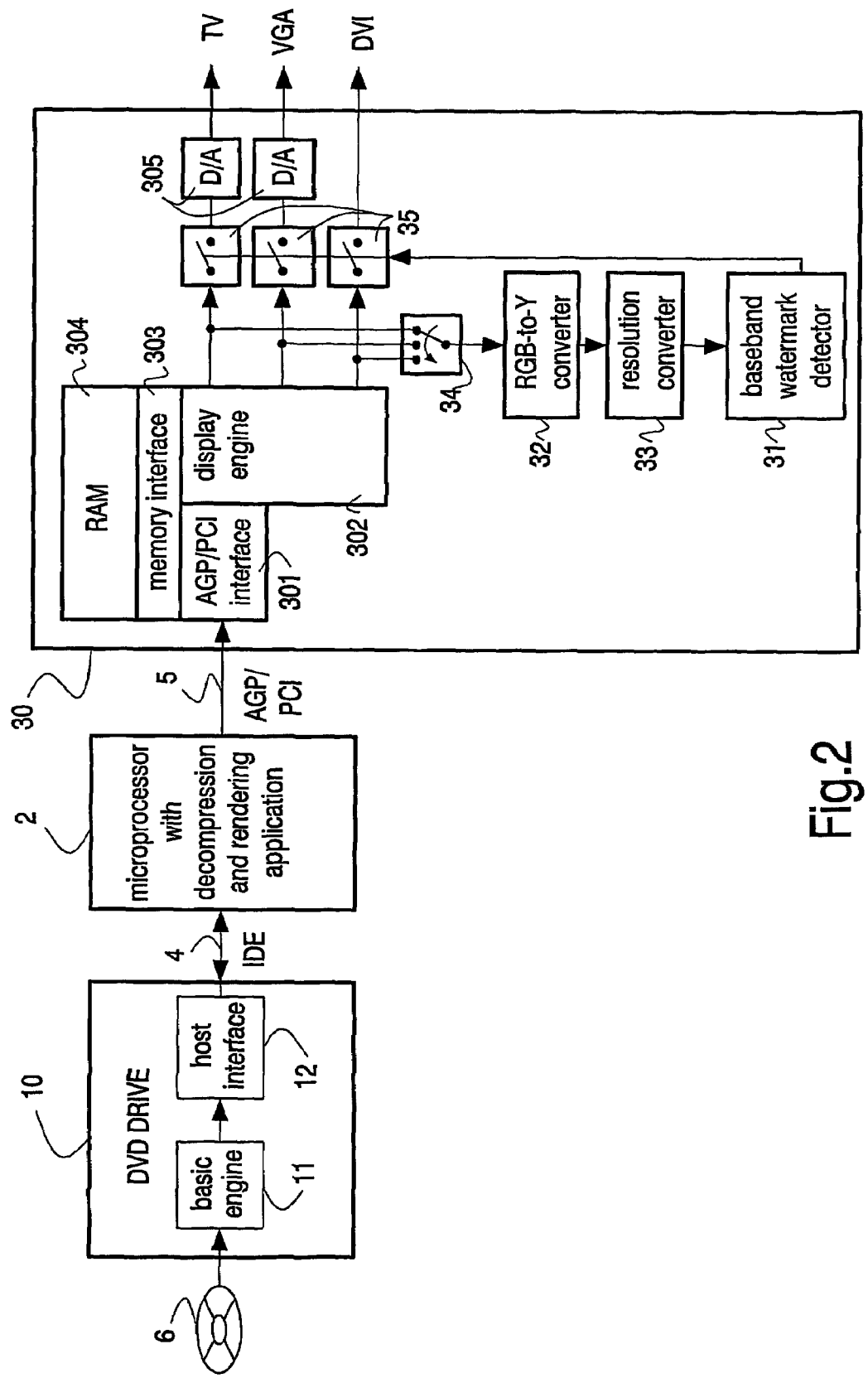
FIG. 2 shows a computer system with a graphics card in accordance with one aspect of the invention.

FIG. 2 shows a computer system with a graphics card 30 (connected to or integrated in the PC motherboard 2) in accordance with one aspect of the invention. The graphics card comprises conventional circuits such as an AGP/PCI interface 301, a display engine 302, a memory interface 303, a video RAM 304, and D/A convertors 305. A baseband watermark detector 31 is coupled to the output (or multiple outputs) of the graphics card, just before video data is applied to an (external) display screen. The watermark detector 31 controls one or more switches 35 to prevent content from being displayed on the display screen, in accordance with the applicable copy protection algorithm. The switches 35 have the same function as the switch 15 in FIG. 1.

One of the problems is that the data on the output(s) is in RGB format whereas most watermark-schemes work with the luminance channel. Conversion from the RGB format to luminance Y according to the well-known formula (Y/0.587) =0.509 R+G+0.194 B (where $0 \leq R,G,B<1$) requires 2 additions and 2 multiplications. This is very costly, especially at high data rates.

In the system according to the invention, an RGB-to-Y converter 32 avoids multiplications by approximating Y, e.g. $Y \approx 0.25$ R+0.5 G+0.125 B=R/4+G/2+B/8 which can be implemented with only arithmetic shifts. In an embodiment, which even prevents additions, the converter simply selects the green color signal so that $Y \approx G$ (because G is dominant).

Watermarks are often embedded by 'tiling' a small-sized basic watermark pattern over the entire image. The corresponding watermark detector divides the suspect image into image areas of the same size as the basic watermark pattern, accumulates said image areas in a buffer (a process referred to as folding), and checks the buffer for the presence of the basic watermark pattern in the accumulated image area. If the watermark detector 31 is of such a type, the 3 primary colors R,G,B are advantageously accumulated and folded first, using 3 separate fold-buffers. The conversion of RGB to Y is now performed off-line, after folding, instead of on-the-fly. This procedure takes 3 times more memory but that can usually be neglected with respect to the amounts of video-memory used for other purposes. This option requires more memory bandwidth though, because 3 times as much data must be transported to memory.

Another problem associated with the architecture, which is shown in FIG. 2, is that the video coming out of the graphics-card can be at any number of resolutions, as is illustrated in the following Table:

TABLE

Comparison of the resolutions and pixel-clock of some common graphics standards

| Standard | Resolution | pixel-clock [MHz] |
| --- | --- | --- |
| VGA | 640 × 480 | 27 |
| XGA | 1024 × 768 | 70 |
| SXGA | 1280 × 1024 | 116 |
| UXGA | 1600 × 1200 | 170 |

There are other also other standards supported by some graphics cards, with interpolating resolutions. Note that the pixel-clock for normal baseband watermark detection (in PAL or NTSC) is 13.5 MHz. The output interface may thus have an up to 13× higher data rate (UXGA-mode) compared to normal PAL/NTSC baseband-detection. Baseband detection requires one addition for every pixel, so the adder has to work 13× faster.

To alleviate this problem, the graphics card includes a resolution converter 33, which sub-samples the pixel-data in space (and possibly also in time): e.g. the only information used for detection is line 1 from frame 1, line 2 from frame 2 etc. Alternatively, only a part of the images is being watermark detected.

Further, as shown in FIG. 2, there are multiple outputs on the graphics card. Currently, a computer (or its graphics card) is provided with a conventional VGA-output as well as a TV-output for displaying a DVD-movie rendered on the PC on a living-room TV. Recently the digital DVI-interface has been added to this palette. Because all these outputs can be controlled independently (i.e. display different data), naively the number of detectors should equal to the number of outputs, which constitutes a significant cost-burden.

This problem is solved by time-multiplexing the watermark detector onto the different outputs: i.e. first detect for a fixed amount of time on output 1, then on output 2 etc. To this end, the system includes a selector 34, which time-sequentially selects one of the outputs of the graphics card. It is also possible to check all outputs simultaneously.

There are a number of further problems associated with detecting a watermark in the signal being generated by the graphics card of a personal computer. These further problems are caused by the fact that a personal computer is generally able to simultaneously execute a plurality of applications in respective 'windows' of the display screen. Each window may often be arbitrarily positioned and scaled by the user.

The potential range of scales that the watermark detector 31 needs to deal with is thus very large. One of the highest scales still preserving visual quality is to display contents (e.g. a full-screen DVD-movie) on the monitor (blow up to 1600×1200 pixels or even more). Roughly the lowest scale is when the video is reduced to 352×200 pixels, which is a popular format for movies downloaded from the internet. The scale-range horizontally is thus 0.5 . . . 2.2 and vertically 0.4 . . . 2.5, whereas currently available watermark detectors are designed to deal with scales in the range 0.5 . . . 1.5.

In accordance with a second aspect of the invention, the video output of the computer is examined to locate image areas in which the signal changes from frame to frame. The video is thus distinguished from all the other information on the desktop, because real-time video contains many more changes. A bounding box is then generated around said image areas to provide a (preferably rectangular) area of interest. The bounding box is now considered to constitute the window in which the application runs.

Figure 3:
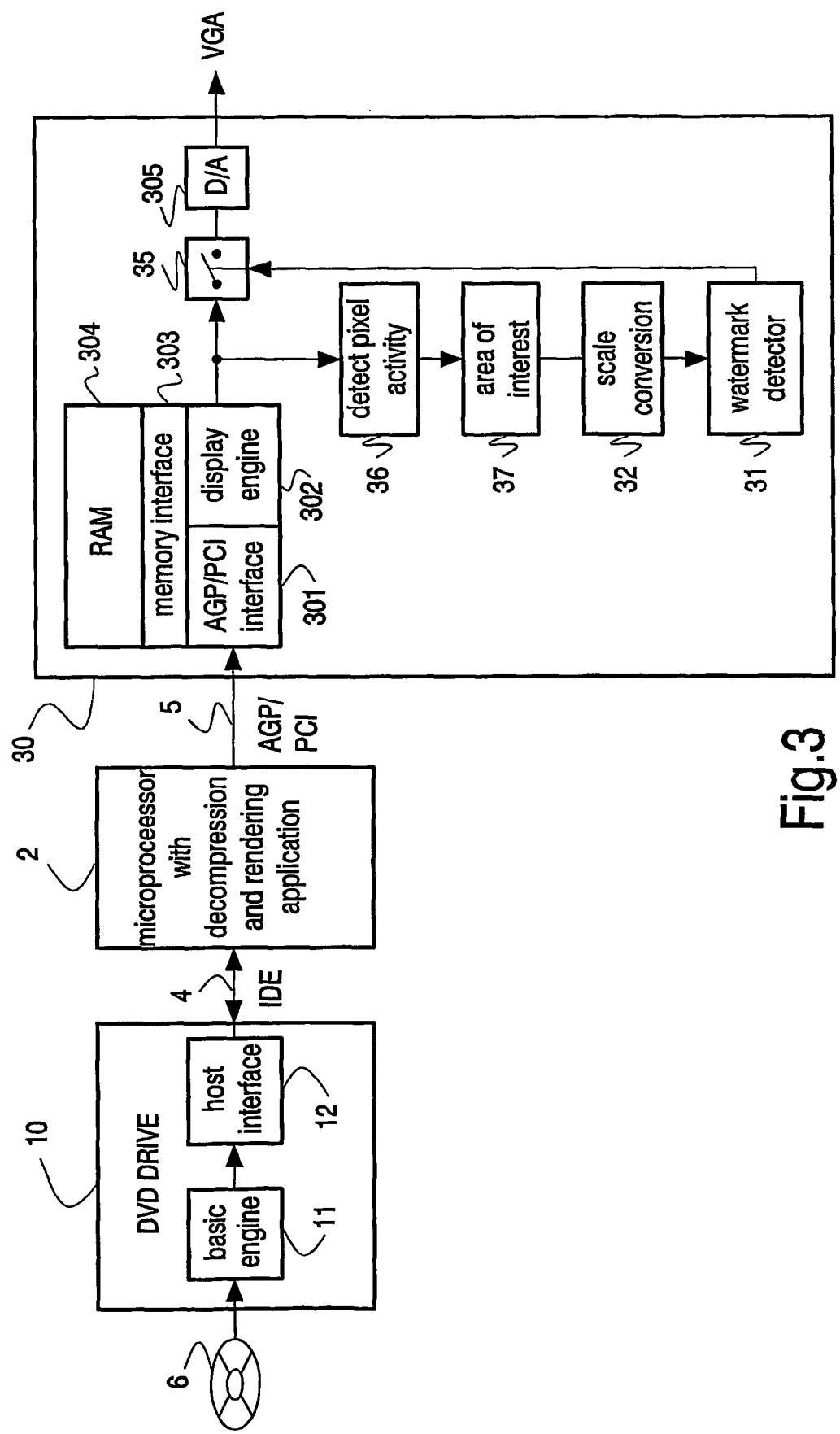
FIG. 3 shows a computer system with a graphics card in accordance with a further aspect of the invention.

FIG. 3 shows schematically a PC in accordance with this aspect of the invention. In this Figure, a pixel activity detector 36 detects and stores (thresholded) changes with respect to the previous frame. A joining circuit 37 fits a bounding box around image areas with significant change. It is well known from the literature how, starting from an area of activity one can determine the tightest possible bounding-box including such a point. Normal watermark detection is subsequently performed, where necessary preceded by scale conversion 32. In other words, whereas before (cf. FIG. 2) we had only scale detection and payload detection, we have now added "area-of-interest-detection".

Figure 4A:
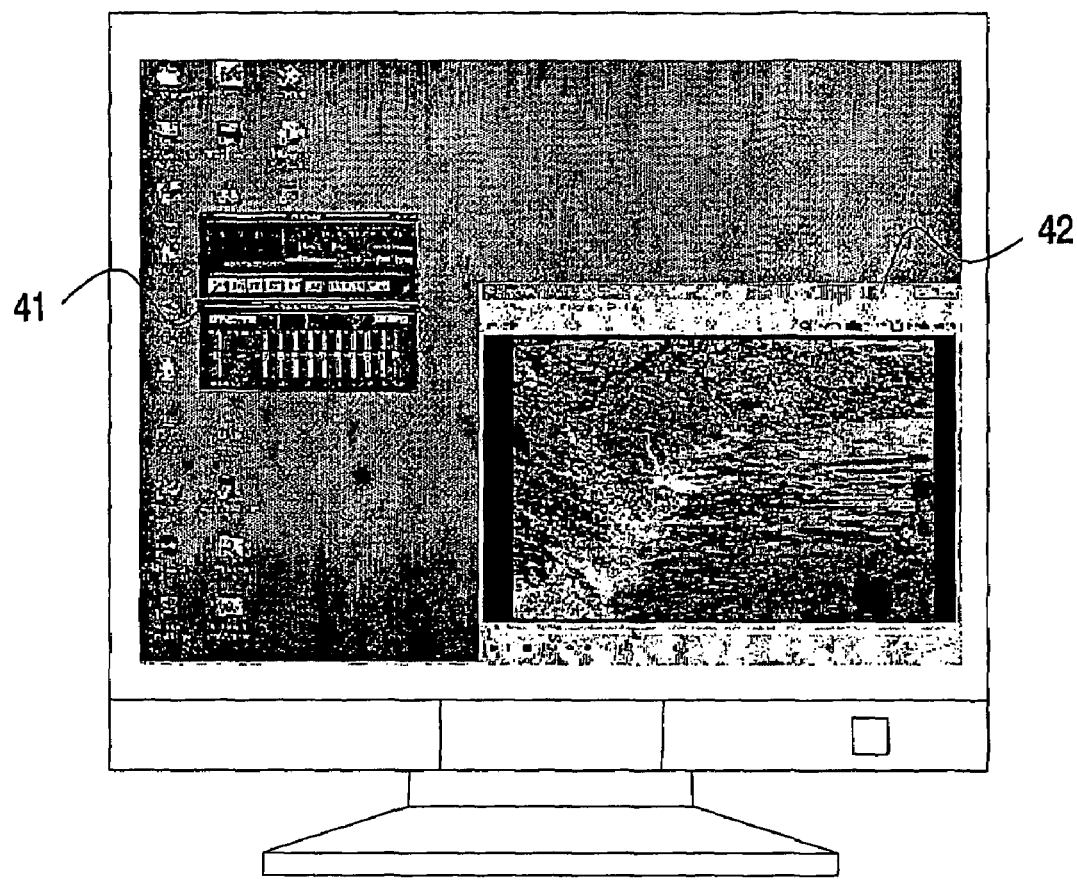
FIGS. 4A and 4B show screen shots to illustrate the operation of the personal computer, which is shown in FIG. 3.
Figure 4B:

To illustrate the operation of this PC architecture, FIG. 4A shows the desktop of a Microsoft Windows® operating system with two application windows 41 and 42, in which different applications are running. In this example, window 42 is generated by a DVD-movie player application. FIG. 4B shows the contents of the area-of-interest as detected by the circuitry (36, 37) in the graphics card. If the content in the area-of-interest is upsampled or downsampled to the normal 720×480 or 720×576 format, and supplied to a normal baseband watermark detector, it is very likely that the content is now processed at a scale sufficiently close to 1.0.

It should be noted that the change-detection 36 may be performed on a sub-sampled video-frame to conserve storage space. The change-detection may also be performed "block-for-block" (e.g. first try to find the change-areas in the top-left corner, then in the top-right corner etc.).

Figure 5:
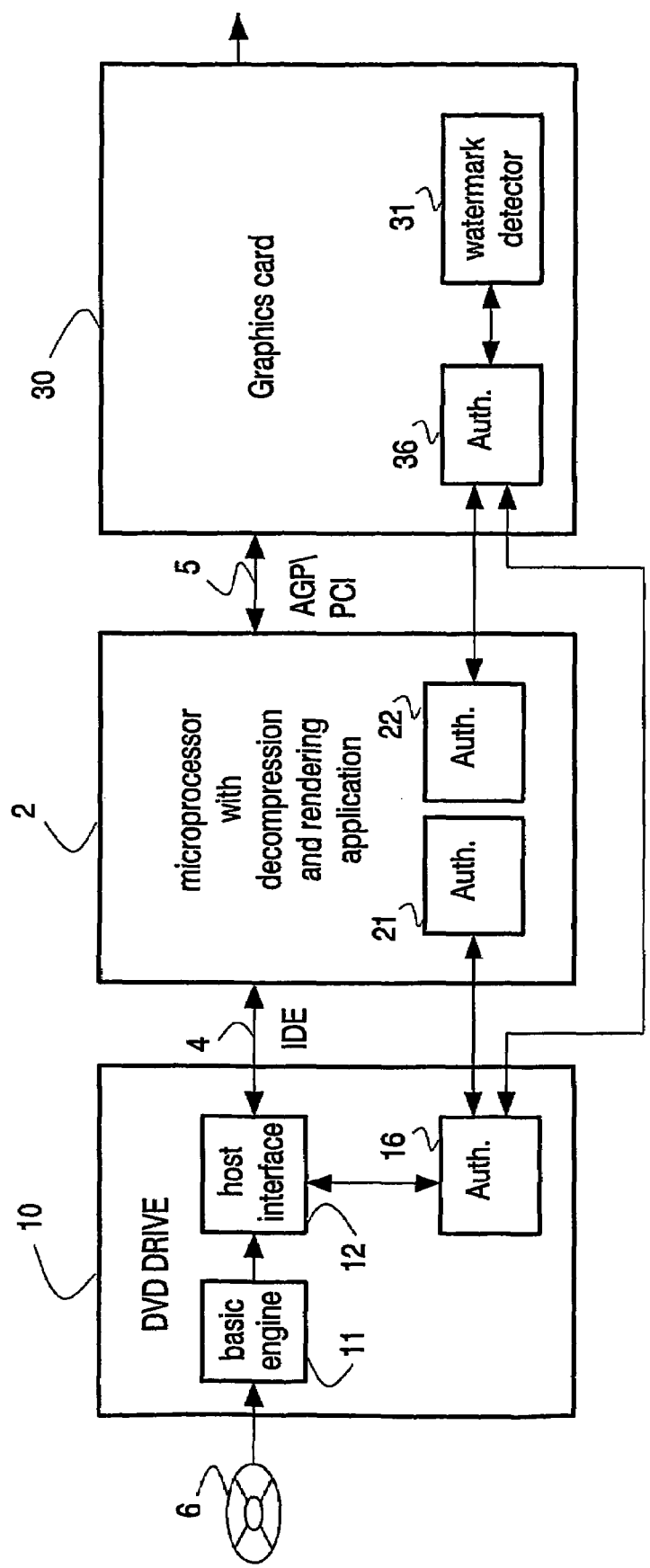
FIG. 5 shows a diagram of protocols carried out by the personal computer, which is shown in FIGS. 2 and 3.

A further aspect of the invention relates to acting on the detected presence or absence of the watermark. FIG. 5 shows schematically a diagram of protocols to make sure that all components are functioning ensure watermark detection. The blocks 16, 21, 22, and 38 denote authentication processes or devices. In this architecture being envisaged, the DVD-drive 10 checks, on boot-up, whether there is a graphics-card 30 with watermark detector 31 present in the PC. If such a graphics-card with watermark-detector is not present then the drive will not output data. If such a special graphics card is present however, it will output data.

When the watermark detector 31 in the graphics card detects a watermark it will try to authenticate to a compliant application which is responsible for rendering the watermarked data. If such authentication is successful, the graphics card continues operation (e.g. a valid DVD-Video is being played back using an authorized application). If it cannot find such a compliant application, the content must have come from some non-authorized source, e.g. an illegally copied disk in the drive is being rendered by some pirate or other non-compliant software. The graphics card will then shut down such output through activating the switches 35 (see FIGS. 2 and 3), or otherwise destroy the viewing pleasure of the boxed area in which the watermark was detected. Alternatively, a message can be scrolled across the whole image to indicate the detection of a watermark in a non-authenticated stream.

The PC runs one or more applications, such as decompressing and rendering possibly watermarked contents obtained from a source such as DVD drive 10. Note that the compliant application is certain about the origins of the data which it is rendering because it has also authenticated with the drive. Note also that the architecture is more general. More particularly, the source is not necessarily a DVD-drive. For example, the source may also be an analog capture card, an MPEG-encoder card, or an IEEE-1394 board.

In the architectures shown above, a hacker may perform the following hack: (s)he copies illegal content which (s)he wants to watch from a DVD+R to the hard disk, without rendering. Then (s)he plays any valid protected DVD-video from the DVD-drive with a compliant application in one window, while the illegal material is rendered by a non-compliant application in another window. The watermark detector will find a watermark (in either one of the windows) but assume that to be consistent with the original movie in the DVD drive. Thus the illegal material is not caught. It is even possible to abuse a compliant application: the illegal content on the hard disk can re-encrypted with CSS (which has been hacked), thus disguising it as valid content. This ReCSS-ed content is thus accepted by the compliant player, and after watermark detection in the graphics card, this application will vouch for it.

Therefore, when the detector has found watermarked content, which (through authentication) can be traced back to a compliant application or drive, the detector continues to search other areas-of-interest, and detect watermarks therein. In practice one could implement this by starting the bounding-box at a random point on the display, to avoid ending up with the same bounding-box all the time. If another watermarked area-of-interest is found, there must also be another compliant application or source. In the absence thereof, illegal contents is being played back, and the graphics card is controlled to act accordingly.

As an alternative the graphics card may notify the drive of the watermark-payload using the authenticated channel set up at boot-time. The drive can verify from the disk whether this watermark-payload is commensurate with this disk. If not, some other source of copied material must exist. Note that for this method to work, the watermark-payload needs to be stored on the disk in a manner that it cannot be retrieved by a hacker, e.g. in some currently unused sector in the lead-in area. This does not add cost to the drive.

A hacker may perform the following hack: he inserts a second non-compliant graphics card into the PC. He allows the drive to authenticate to the graphics card (using a hacked driver), while he uses the non-compliant card to playback illegal material from the drive. A second hack scenario is when he only inserts a non-compliant graphics card into his PC but connects the PC via a network (home network or internet) to another PC with a compliant graphics card. After authenticating the drive with the remote compliant graphics-card, illegal content is displayed on the on-board non-compliant graphics card. A third hack scenario is where there is a compliant DVD-drive and a compliant graphics card with watermark detector in a single PC: after authentication the hacker streams the data from illegal disk in the drive to a non-compliant application running on another PC with a non-compliant graphics card somewhere in the network.

The operating system and the BIOS are the only entities in the PC which have reliable knowledge about the plug-in card configuration of the PC. A solution for the first hack-scenario is for the BIOS or OS to prohibit combinations of compliant and non-compliant graphics cards in a PC (for security reasons). A solution for the second hack-scenario is for OS and BIOS to disallow authentication with graphics cards across the network. A way to implement this would be for the OS to query the drive which graphics card it authenticated with and to check that the device is indeed on board. This obviously requires a secure OS. If it is a market requirement that playback from a remote DVD-drive in a home network should be allowed, the second scenario hack of problem 7 cannot be prevented. Another solution is for the OS to prohibit combinations of compliant drive and non-compliant graphics card in the same box.

The invention may be summarized as follows. Watermark-detection in the graphics card of a personal computer, for the purpose of copy-protection, has recently started to draw a lot of attention in standardization. Detection in the graphics card has problems completely different from the formerly considered detection in the DVD-drive, having to do with high data-rates, large scale-ranges and presence of multiple video-streams in the display area. This invention proposes examining (36) the video signal being generated by the computer system to locate image areas in which the video signal changes from frame to frame, and defining (37) a bounding box around said image areas to provide an area of interest. The area of interest thus found is considered to constitute a window in which an application is running. After appropriate scale conversion (32), conventional watermark detection (31) is subsequently applied to said window. Multiple windows can be detected in this manner. This prevents hackers from rendering illegal contents in one window while playing back a compliant disk in the DVD drive (10).

The invention claimed is:

1. A method, comprising:
   examining a video signal being generated by a computer system and applied to a display screen to locate image areas in which the video signal changes from frame to frame;
   converting RGB pixel values in the video signal into luminance values (Y) in order to determine luminance values of Y as R/4+G/2+B/8, where R is a red component, G is a green component, and B is a blue component of the RGB pixel values:
   defining a bounding box around the image areas to provide an area of interest; and
   detecting a watermark in said area of interest.

2. The method of claim 1, wherein the bounding box is rectangular.

3. The method of claim 2, including scaling the area of interest to a predetermined resolution.

4. The method of claim 3, wherein the video signal includes an RGB encoding of each frame, and the method includes converting the RGB encoding into a luminance encoding to facilitate detecting the watermark.

5. The method of claim 1, including examining the video signal for further areas of interest, and detecting the watermark in the further areas of interest.

6. The method of claim 1, wherein the video signal includes an RGB encoding of each frame, and the method includes converting the RGB encoding into a luminance encoding to facilitate detecting the watermark.

7. The method of claim 1, including controlling a source of at least a portion of the video signal based on detecting the watermark.

8. A computer system, comprising:
   a display screen, and
   a graphics card adapted to render a possibly watermarked multimedia signal in a window of the display screen, the multimedia signal being generated by an application executed by the computer system, wherein the graphics card includes:
an RGB-to-Y converter that is configured to convert RGB pixel values in the video signal into luminance values (Y), wherein the RGB-to-Y converter is configured to determine luminance values of Y as R/4+G/2+B/8, where R is a red component, G is a green component, and B is a blue component of the RGB pixel values;
means for examining a video signal being applied to the display screen to locate image areas in which the video signal changes from frame to frame;
means for defining a bounding box around the image areas to provide an area of interest; and
a watermark detector for detecting the watermark in the area of interest.

9. A computer system, comprising:
a display engine that is configured to generate a video signal that includes one or more display windows;
an RGB-to-Y converter that is configured to convert RGB pixel values in the video signal into luminance values (Y), wherein the RGB-to-Y converter is configured to determine luminance values of Y as R/4+G/2+B/8, where R is a red component, G is a green component, and B is a blue component of the RGB pixel values;
a detector that is configured to identify locations of changes of picture element values in the video signal;
a processor that is configured to define a bounding box based on the locations of changes; and
a detector that is configured to detect a watermark in the video signal within the bounding box.

10. The computer system of claim 9, including a resolution converter that is configured to scale at least a portion of the video signal.

11. The computer system of claim 9, wherein the RGB-to-Y converter is configured to determine luminance values of Y based solely on the green component.

12. The computer system of claim 9, wherein the bounding box is rectangular.

13. The computer system of claim 9, wherein the detector, processor, and detector are configured to examine the video signal to locate further locations of further changes of picture element values, and to detect a further watermark in a bounding box based on the further locations of the further changes.

14. The computer system of claim 9, further including one or more switches that are configured to control one or more outputs of the graphics card based on detection of the watermark.

15. The computer system of claim 9, wherein the computer system is configured to control one or more external devices based on detection of the watermark.

16. The computer system of claim 9, including a display device that is configured to receive the video signal and display the one or more display windows.

* * * * *